US007454532B1

United States Patent
Dickson

(10) Patent No.: US 7,454,532 B1
(45) Date of Patent: Nov. 18, 2008

(54) STREAM DATA INTERFACE FOR PROCESSING SYSTEM

(75) Inventor: Richard Dickson, Sunnyvale, CA (US)

(73) Assignee: Telairity Semiconductor, Inc., Santa Clara, CA (US)

( * ) Notice: Subject to any disclaimer, the term of this patent is extended or adjusted under 35 U.S.C. 154(b) by 692 days.

(21) Appl. No.: 10/410,657

(22) Filed: Apr. 8, 2003

(51) Int. Cl.
*G06F 3/00* (2006.01)
*G06F 13/00* (2006.01)
*G06F 9/30* (2006.01)

(52) U.S. Cl. .............................. 710/20; 710/5; 710/29; 710/31; 710/36; 712/218

(58) Field of Classification Search ................... 710/38, 710/51, 29
See application file for complete search history.

(56) References Cited

U.S. PATENT DOCUMENTS

| 4,675,836 | A | * | 6/1987 | Arnould et al. | ............. | 708/402 |
| 4,679,163 | A | * | 7/1987 | Arnould et al. | ............. | 708/402 |
| 5,305,443 | A | * | 4/1994 | Franzo | ........................ | 710/110 |
| 6,012,137 | A | * | 1/2000 | Bublil et al. | ................... | 712/36 |
| 6,377,998 | B2 | * | 4/2002 | Noll et al. | .................... | 709/236 |
| 2002/0108026 | A1 | * | 8/2002 | Balmer et al. | ............... | 712/218 |
| 2003/0145259 | A1 | * | 7/2003 | Kashiwakura | .............. | 714/712 |
| 2004/0098570 | A1 | * | 5/2004 | Giri | .......................... | 712/241 |

* cited by examiner

*Primary Examiner*—Alan Chen
(74) *Attorney, Agent, or Firm*—Townsend and Townsend and Crew LLP

(57) ABSTRACT

Techniques are provided for processing data in real-time or near real-time using a processor. The processor passes the real-time input data directly to functional units via a bypass multiplexer without storing the data in memory. The functional units process the input data and provide output data. The output data of the functional units is transmitted outside the processor without being stored in memory. Alternatively, the output data of the functional units can be stored in memory in the processor. Input data that needs to be maintained in the processor for a period of time is stored in memory.

10 Claims, 1 Drawing Sheet

STREAM DATA INTERFACE FOR PROCESSING SYSTEM

BACKGROUND OF THE INVENTION

The present invention relates to processing systems that receive and transmit real-time or near real-time data, and more particularly, to processing systems that receive and transmit data without first storing the data in memory.

Computer processors typically include register files for storing data. A register file includes memory (e.g., registers) that stores the data. When data is input into a processor, the processor initially stores the data in the register file through one of the register file's write ports.

When the processor wants to process the data, the processor reads the data from the register file through one of the register file's read ports. The data read from the register file is then passed to one or more functional units using a multiplexer. The functional units process the data.

The output data of the functional units is stored back in the register file through a register file write port. The processor outputs data by reading the data from a read port of the register file and then transmitting the data outside the processor.

Because processors store data in the register file before and after processing the data, processors cannot process data quickly enough for real-time processing applications. Therefore, it would be desirable to provide processors that process data more quickly.

BRIEF SUMMARY OF THE INVENTION

The present invention provides techniques for processing data in real-time or in near real time using a processor. Real-time input data is provided to the processor on an input data stream. The input data is not stored in memory in the processor before the data is processed. The input data is passed directly to functional units via a bypass multiplexer without being stored in a register file. Because input data bypasses the register file, input data can be loaded into functional units within a processor more quickly.

Data can also be transmitted outside a processor more quickly. Output data of the functional units is not stored in the register file (or any other memory unit) before being transmitted outside the processor. Input and output data that needs to be maintained in the processor for a period of time is stored in the register file.

Instruction codes are provided to the bypass multiplexer, the functional units, and the register file. The instruction codes can be temporarily stored in registers so that the most recent instruction codes are saved if the input data stream stops. These registers allow the instructions code to be synchronized with the real-time input data.

The present invention eliminates the need for extra write ports in the register file. Processors of the present invention are also more efficient and faster, because extra load and read instructions are not needed to store real-time data in the register file.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
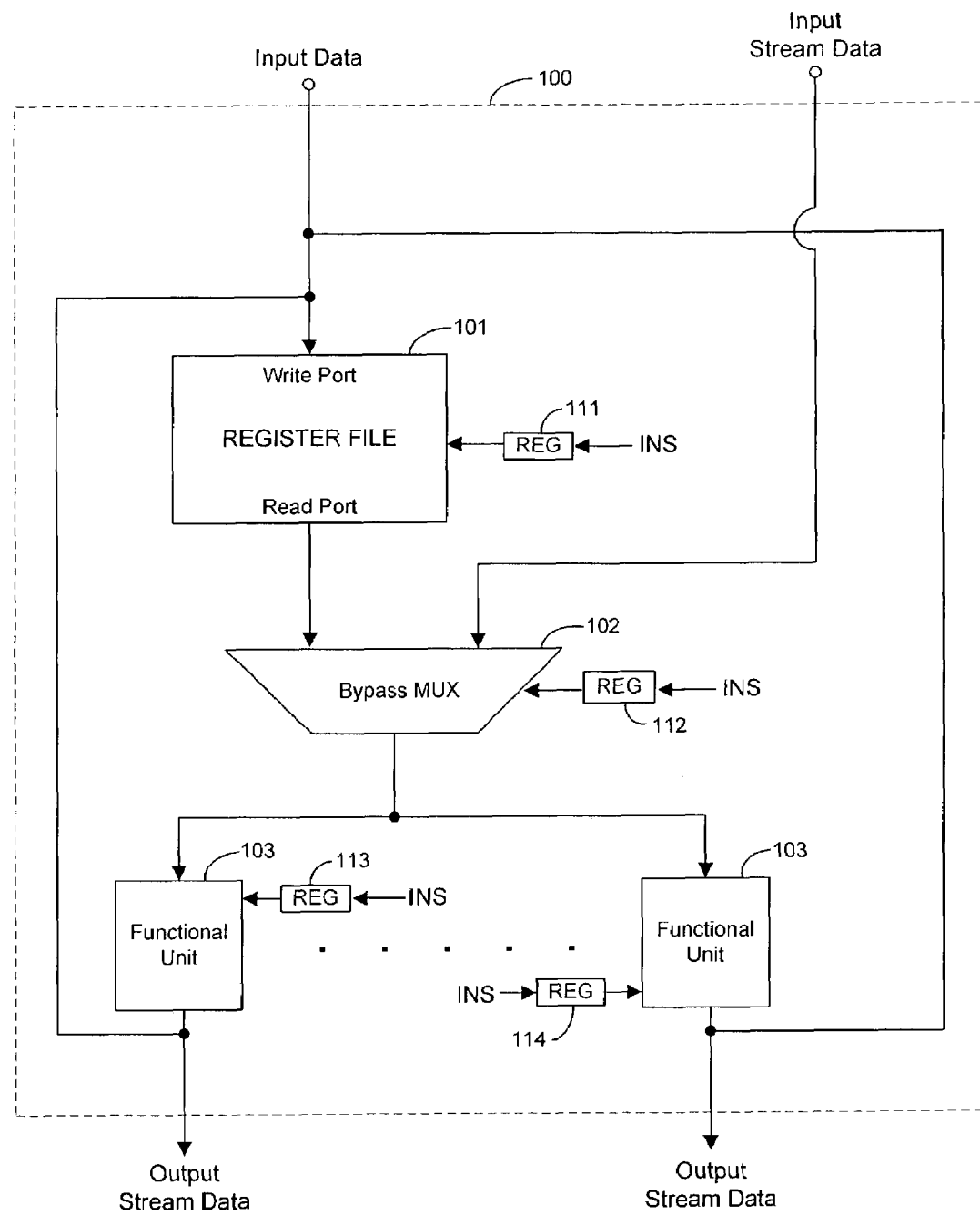
FIG. 1 illustrates a processing system that processes real-time or near real-time data according to the principles of the present invention.

FIG. 1 illustrates a processing system (or processor) 100 according to an embodiment of the present invention. Processing system 100 includes register file 101, bypass multiplexer 102, and a plurality of functional units 103. Register file 101 includes numerous memory cells (e.g., registers). Two functional units 103 are shown in FIG. 1 as an example. However, processor 100 can include any suitable number of functional units 103. Processor 100 can be formed on an integrated circuit.

Input data that needs to be maintained by processor 100 for a period of time can be stored in register file 101. As shown in FIG. 1, input data is received by processor 100 at an external processor port. The input data is then transmitted from the external port to register file 101 at its write port. Register file 101 uses a load instruction to store input data in its memory cells.

Data can be accessed from register file 101 from its read port. Register file 101 retrieves data from its memory cells using a read instruction. Data is read out of register file 101 and provided to a first input of bypass multiplexer 102. Multiplexer 102 selects its first input and transmits the data from register file 101 to one or more of functional units 103.

The output data of functional units 103 can be stored in register file 101 through a write port using register file load instructions. The connections between the outputs of functional units 103 and the write port of register file 101 are shown in FIG. 1. The output data can be stored in register file 101 through the same write port used to store in the input data (as shown in FIG. 1) or through separate write ports.

Processors of the present invention can process data in real-time or near real-time as will now be discussed. Processor 100 receives input stream data at an external port as shown in FIG. 1. The input stream data is any type of data that does not need to be stored by processor 100 for a period of time. Therefore, the input stream data is not stored in register file 101 (or any other memory unit). By not storing the input stream data in register file 101, extra load and read instructions used by register file 101 to store the input stream data are eliminated. Also, extra memory locations in register file 101 are not taken up by data that does not need to stored by processor 100.

The input stream data is provided directly to a second input of bypass multiplexer 102 as shown in FIG. 1. Instruction codes control which of the two inputs of multiplexer 102 is coupled to the multiplexer's output terminal.

Multiplexer 102 can pass the input stream data directly to one or more of functional units 103. Functional units 103 process the input stream data to provide output data. Functional units 103 can also process data received from register file 101 to provide output data. Functional units 103 can perform any processing operations on the data, such as arithmetic functions, Boolean functions, and logical operations. Functional units 103 can contain storage locations (e.g., latches or registers) that temporarily store data received from multiplexer 102 as the data is processed according to well known techniques.

Functional units 103 are also controlled by instructions codes. The instruction codes control the passage of data through functional units 103.

As shown in FIG. 1, the output data of functional units 103 can be real-time or near real-time output stream data. The output stream data can be transmitted from functional units 103 directly out of processor 100 without being stored in register file 101 or any other memory unit in processor 100. The output stream data is transmitted from functional units 103 to external ports of processor 100.

By not storing the output stream data in memory in processor 100, extra load and read instructions used by register file 101 to store the output stream data are eliminated. Also, memory locations in register file 101 are not taken up by data that does not need to stored by processor 100.

Data can be transferred into and out of functional units 103 without being stored in memory in processor 100 (e.g., register file 101). By not storing data in memory, processor 100 can process data in real-time or in near real-time. According to one application of the present invention, a plurality of processors coupled in series can perform a variety of processing techniques on data in real-time or near real-time using the stream data processing techniques described herein.

The present invention is also advantageous, because fewer write ports are needed in register file 101 for receiving the input stream data. Therefore, techniques of the present invention reduce the input circuitry in file register 101. In addition, the present invention reduces the number of clock cycles in processor 100, because the input and output stream data is not loaded into or read out of register file 101. By not storing the input and output stream data in register file 101, the present invention also increases the available memory in register file 101. This is advantageous, because memory in register file 101 is limited.

Each of the circuit blocks shown in FIG. 1 are controlled by instruction codes. Each instruction code corresponds to a particular input or output data bit or bits. The instruction codes control the transfer of data into and out of register file 101, bypass multiplexer 102, and functional blocks 103. The instruction codes are provided to circuits 101-103 from a stream of instruction code sequences (INS), as shown in FIG. 1.

The present invention also provides techniques for synchronizing the input stream data with the instruction codes. The input stream data is not stored in memory in processor 100 before the input stream data is passed to functional blocks 103 through bypass multiplexer 102.

The input stream data can be stalled periodically. When the input stream data is stalled, no input stream data is received at bypass multiplexer 102. When the input stream data begins to flow into processor 100 again after being stalled, the instruction codes would no longer match the correct input stream data bits, if the instruction code sequence continued to flow.

To solve this problem, processor 100 includes registers 111-114 as shown in FIG. 1. Registers 111-114 may include flip-flops, latches, or any other suitable memory storage cells. Registers 111-114 may comprise shift registers.

Registers 111-114 temporarily store instruction codes in the instruction sequence, before the instruction codes are passed to circuit blocks 101-103. Registers 111-114 each receive a control signal (not shown). The control signal may originate from outside processor 100. The control signal indicates to registers 111-114 when the input stream data signal has been stalled.

When the control signal indicates that the input stream data signal has stopped, registers 111-114 stop outputting instruction codes to circuits 101-103. When the input stream data is stalled, instruction codes can continue to be sent to inputs of registers 111-114. Registers 111-114 store the incoming instructions codes until the control signal indicates that the input stream data is flowing into processor 100 again. Registers 111-114 preferably have sufficient memory to store all the instruction codes that the registers receive during the longest possible pause in the input stream data signal.

When the control signal indicates that input stream data is again flowing into processor 100, registers 111-114 resume outputting instruction codes to circuits 101-103. Registers 111-114 allow the instruction codes to continue to be matched with the correct input stream data bits even after pauses in the input stream data signal. For example, instructions codes provided to multiplexer 102 are synchronized with the input stream data bits. Instruction codes that are provided to functional units 103 from registers 113-114 are synchronized with the output data of multiplexer 102.

The control signal also stops instruction codes from being passed to register file 101. Therefore, register file 101 stops functioning until the instructions codes are again received from register 111.

Alternatively, the control signal can connect to the circuitry in processor 100 that generates the instruction code sequence. When the input stream data signal is stalled, the control signal causes this circuitry to stop outputting instruction codes until input stream data is again received by processor 100. The instruction codes already generated are stored in registers 111-114 (or other memory) until they are needed.

Techniques of the present invention can be used in many different types of processors. For example, the techniques of the present invention can be used in desktop processors, embedded processors, special purpose processors, handheld processors. etc.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiment disclosed, but that the invention will include all embodiments and equivalents falling within the scope of the claims.

What is claimed is:

1. A processing system for processing streaming data as well as other data, the system comprising:

a register file having a write port coupled to receive input data from a first input port and having a read port;

a multiplexer having a first input terminal coupled to receive streaming input data from an external source through a second input port, wherein the processing system does not store the streaming input data before the streaming input data is provided to the multiplexer, the multiplexer having a second input terminal coupled to the read port, and having an output terminal;

at least two functional units coupled to receive the streaming first input data from the output terminal of the multiplexer to perform computational operations on the streaming input data, at least one of the functional units providing streaming output data to a second external port of the processing system, the processing system not storing the streaming input data between the first external port and the second external port; and a feedback connection between the second external port and the write port for returning results to the register file.

2. The processing system of claim 1 wherein the register file comprises a plurality of registers that store at least some of the streaming output data.

3. The processing system of claim 1 further comprising:
   a first register coupled to the multiplexer, wherein the first register stores a first set of instruction codes; and
   a second register coupled to a functional unit, wherein the second register stores a second set of instruction codes.

4. The processing system of claim 3 further comprising a third register coupled to the register file.

5. The processing system of claim 4 wherein the registers temporarily store information to enable processing of the streaming data to be synchronized with operations of the functional units.

6. The processing system of claim 1 wherein the multiplexer, the first and the second functional units and the register file are all on one integrated circuit.

7. A method for processing data using a processor having a first input port coupled to a register file, a second input port for receiving streaming data, a multiplexer coupled to the register file and to the second input port, the processor including a plurality of functional units for processing data coupled to an output port of the multiplexer and to an output port, and including at least one feedback connection between the output port and the register file, the method comprising:
   using the multiplexer to bypass the register file, receiving streaming data at the second input port, and, without storing that streaming data, using at least one of the plurality of functional units to process that streaming data;
   providing non-streaming data to the first input port and storing at least some of that data in the register file;
   transmitting output data from the at least one of the plurality of functional units used to process that streaming data to outside the processor without ever storing the streaming data in the processor; and
   providing some data from at least one of the functional units to the register file to be used in subsequent operation of the processor.

8. The method of claim 7 further comprising using at least some of the data stored in the register file to control the at least one of the plurality of functional units which processes the streaming data.

9. The method of claim 8 further comprising using a plurality of the functional units to process the streaming data.

10. The method of claim 7 wherein each of the register file, the multiplexer and each of the functional units are coupled to control registers for controlling their respective operations, and the method further comprises loading the control registers with information regarding instructions to be performed on the streaming data to enable coordination of the functional units with desired processing of the streaming data.

* * * * *